US012681886B2

(12) United States Patent
Willhalm et al.

(10) Patent No.: US 12,681,886 B2
(45) Date of Patent: Jul. 14, 2026

(54) TRANSACTIONAL MEMORY SUPPORT FOR COMPUTE EXPRESS LINK (CXL) DEVICES

(71) Applicant: Intel Corporation, Santa Clara, CA (US)

(72) Inventors: Thomas J. Willhalm, Sandhausen (DE); Francesc Guim Bernat, Barcelona (ES); Karthik Kumar, Chandler, AZ (US); Marcos E. Carranza, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,735

(22) Filed: Sep. 30, 2022

(65) Prior Publication Data

US 2023/0022544 A1     Jan. 26, 2023

(51) Int. Cl.
*G06F 13/42* (2006.01)
*G06F 9/46* (2006.01)
*G06F 13/16* (2006.01)

(52) U.S. Cl.
CPC .......... *G06F 13/4221* (2013.01); *G06F 9/467* (2013.01); *G06F 13/1668* (2013.01)

(58) Field of Classification Search
CPC ... G06F 13/4221; G06F 9/467; G06F 13/1668
See application file for complete search history.

(56) References Cited

U.S. PATENT DOCUMENTS

| | | | | |
|---|---|---|---|---|
| 8,266,387 B2 * | 9/2012 | Taillefer | .............. | G06F 9/45533 |
| | | | | 711/147 |
| 2021/0119730 A1 * | 4/2021 | Das Sharma | ......... | H04L 1/0009 |
| 2021/0349840 A1 * | 11/2021 | Kumar | ................ | G06F 13/4068 |

* cited by examiner

*Primary Examiner* — Tim T Vo

(74) *Attorney, Agent, or Firm* — Alliance IP, LLC

(57) ABSTRACT

In one embodiment, an apparatus couples to a host processor over a Compute Express Link (CXL)-based link. The apparatus includes a transaction queue to queue memory transactions to be completed in an addressable memory coupled to the apparatus, a transaction cache, conflict detection circuitry to determine whether a conflict exists between memory transactions, and transaction execution circuitry. The transaction execution circuitry may access a transaction from the transaction queue, the transaction to implement one or more memory operations in the memory, store data from the memory to be accessed by the transaction operations in the transaction cache, execute operations of the transaction, including modifying data from the memory location stored in the transaction cache, and based on completion of the transaction, cause the modified data from the transaction cache to be stored in the memory.

24 Claims, 13 Drawing Sheets

*500*

300

| Global ID 302 | | Attribute Bits 304 | | | | |
|---|---|---|---|---|---|---|
| Local Trans ID 308 | Source ID 310 | Priority 312 | Reserved 314 | Ordering 316 | No-Snoop 318 | Channel ID 306 |

400

415

320

| 31 | | 16 | 15 | | | | 0 |
|---|---|---|---|---|---|---|---|
| R | Format [2b] | Type [5b] | R | TC [3b] | R [4b] | TD | EP | Attr [2b] | R [2b] | Length [10b] |
| | Requester ID [16b] | | | | Tag [8b] | | Last BE [4b] | First BE [4b] |
| | Address [30b] | | | | | | | R [2b] |
| | Data [32b] | | | | | | | |

| | | 16 | 15 | | | | 0 |
|---|---|---|---|---|---|---|---|
| R | Format [2b] | Type [5b] | R | TC [3b] | R [4b] | T D | E P | Attr [2b] | R [2b] | Length [10b] |
| | Requester ID [16b] | | | | Tag [8b] | | Last BE [4b] | First BE [4b] |
| | Address [30b] | | | | | | R [2b] |

330

| Format [2b] | Type [5b] | R | TC [3b] | R [4b] | T D | E P | Attr [2b] | R [2b] | Length [10b] |
| Completer ID [16b] | | | | | Status [3b] | | B C M | | Byte Count [12b] |
| Requester ID [16b] | | | | | | | Tag [8b] | R | Lower Address [7b] |
| Data [32b] | | | | | | | | | |

TRANSACTIONAL MEMORY SUPPORT FOR COMPUTE EXPRESS LINK (CXL) DEVICES

FIELD

This disclosure pertains to computing systems, and in particular (but not exclusively) to hardware transactional memory support (e.g., Intel® Transactional Synchronization Extensions (TSX)) for Computer Express Link (CXL) devices.

BACKGROUND

Compute Express Link (CXL) enables cache coherency for add-on devices such as accelerators or peripheral devices, allowing such devices to perform operations on the main memory of a server. However, CXL does not currently support the synchronization that is needed to ensure consistency of data reads/writes on the application level. One of the challenges that comes with synchronization is performance hits/overheads. One way of allowing multiple entities needing to access a critical section is via locking data during transactional operations. Transactional memory access techniques such as Intel® TSX have proven to have immense benefits for transactional operations with locks, but there is no current means for such techniques to be performed between a CXL-device (e.g., accelerator or peripheral device such as a network card) and a host processor.

DETAILED DESCRIPTION

Figure 1:
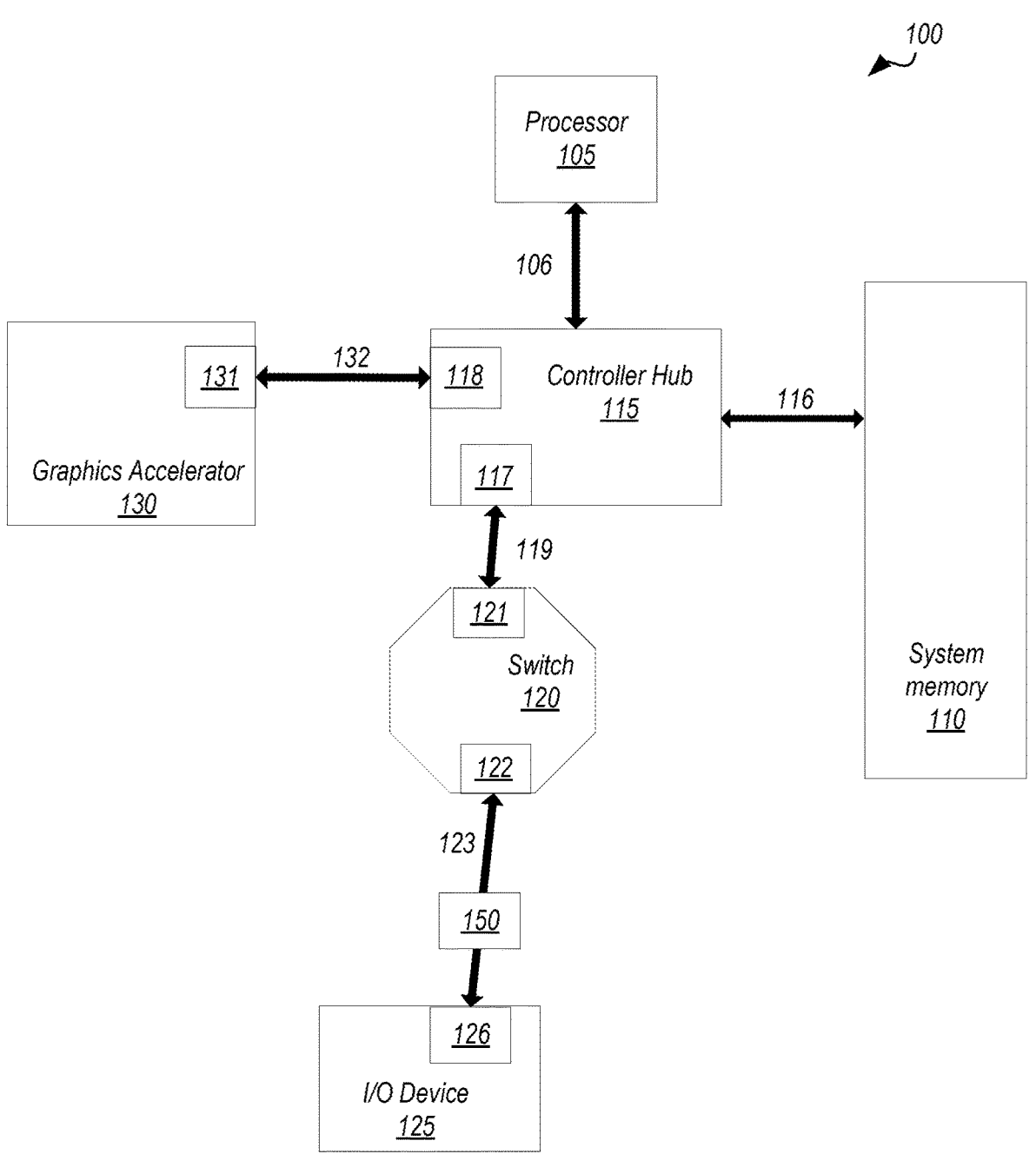
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice embodiments of the present disclosure. In other instances, well known components or methods, such as specific and alternative processor architectures, specific logic circuits/ code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring embodiments of the present disclosure.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present disclosure.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, Cloud, Fog, Enterprise, etc.), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
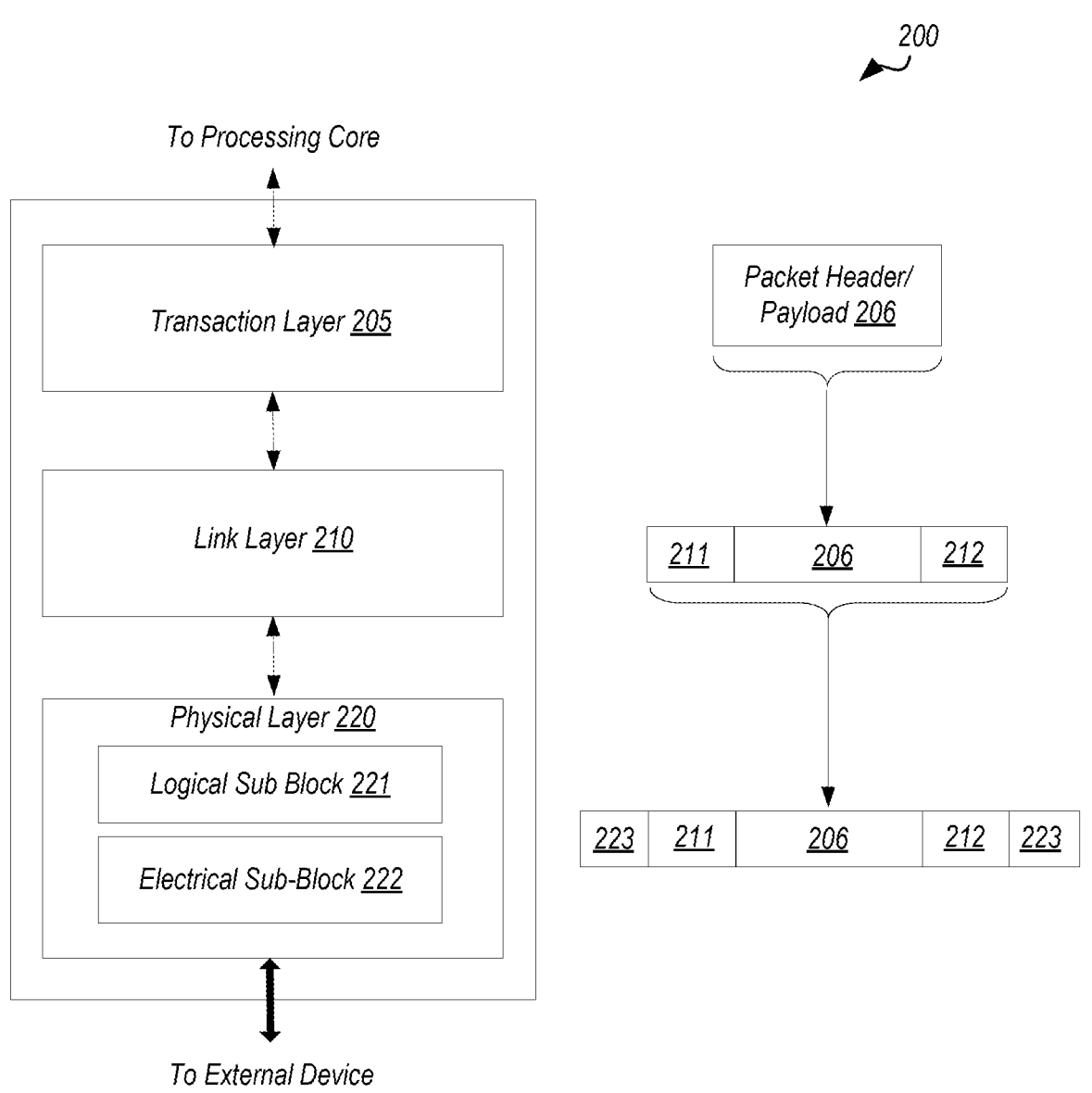
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3A:
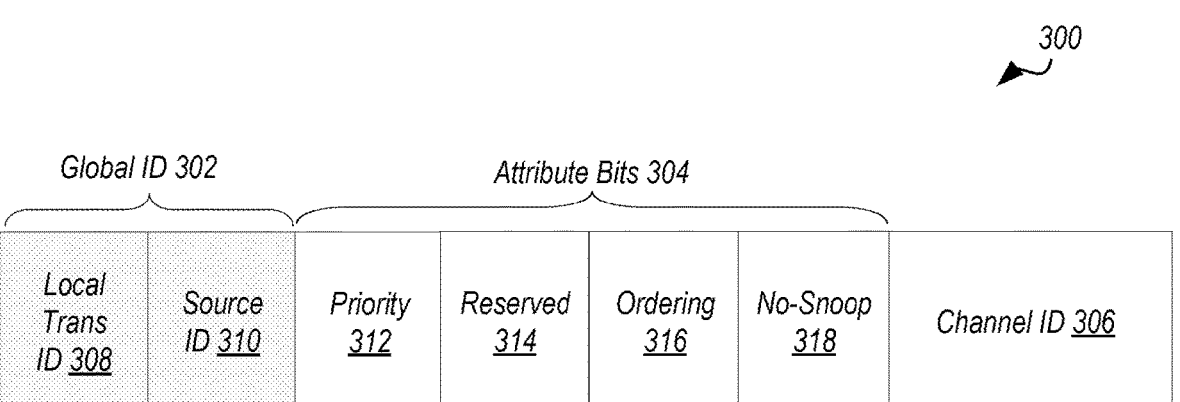
FIGS. 3A-3D illustrate example transaction layer packet (TLP) formats for use within an interconnect architecture.

FIGS. 3A-3D illustrate example transaction layer packet (TLP) formats for use within an interconnect architecture, such as a PCIe-based interconnect architecture. Referring to FIG. 3A, an example of a PCIe transaction descriptor is illustrated. In one embodiment, transaction descriptor 300 is a mechanism for carrying transaction information. In this regard, transaction descriptor 300 supports identification of transactions in a system. Other potential uses include track- ing modifications of default transaction ordering and asso- ciation of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction iden- tifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relation- ships of the transaction. In this regard, attributes field 304 is potentially used to provide additional information that allows modification of the default handling of transactions. In one embodiment, attributes field 304 includes priority field 312, reserved field 314, ordering field 316, and no- snoop field 318. Here, priority sub-field 312 may be modi- fied by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Figure 3B:

Referring to FIG. 3B, an example memory write request TLP format 320 is shown. The example memory write request TLP format 320 includes a number of Reserved (R) bits throughout. In addition, a Format (Fmt) field and Type field are included, and together, these fields may indicate that the TLP is a Memory Write Request. A Traffic Class (TC) field is included to indicate a certain traffic class or virtual channel (VC) for the request. A TLP Digest (TD) bit is included, which may indicate whether there extra CRC on the TLP data. A Length field indicates how much data the TLP includes (in this example, there is one doubleword (i.e., 32 bits) of data). A Requester ID field is included to indicate the sender of the TLP. A Tag field is also included for the sender to indicate certain data of the sender's choosing. A First Byte Enable (BE) field is included, and may allow for choosing which of the four bytes in the first data DW are valid, and should be written. In addition, a Last BE field is included, and may allow for choosing which of the four bytes in the last data DW are valid (in this example, there is only one DW of data, and this would be zero). An Address field is included to indicate the address to which the data is to be written, and finally, a Data field includes the data to be written in response to the memory write request. In some cases, a memory write request TLP may be a "posted" transaction that does not require a corresponding completion indication (e.g., a completion TLP).

Figure 3C:

Referring to FIG. 3C, an example memory read request TLP format 330 is shown. The example format 330 is the same as the format 320 of FIG. 3B, but with the Data field removed. However, in the example format 330, the Format and Type fields now indicate that the packet is a memory read request, and the Length field indicates how many DWs of data are to be read in response to the TLP. Further, The two BE fields indicate the same as in format 320, except that they pick which bytes to read rather than which bytes to write. In some cases, a memory read request TLP may be a "non-posted" transaction that does require a corresponding completion indication (e.g., a completion TLP).

Figure 3D:

Referring to FIG. 3D, an example completion TLP format 340 is shown. A completion TLP may be sent by a completer in response to a non-posted type of transaction (e.g., a memory read request). In the example format 340, the Format and Type fields indicate that the TLP is completion type. The Length field indicates a number of DW of data in the TLP. The Completer ID field indicates the device com- pleting the request (e.g., doing a read in response to a read request, e.g., a read request TLP formatted similar to 330), and the Requester ID indicates the device that initiated the request (e.g., the device that sent a read request TLP formatted similar to 330). The Byte Count field may indicate a number of valid payload bytes in the TLP. The Tag may indicate any value. The Lower Address field indicates the 7 least significant bits of the address in the associated request packet (e.g., the Address field in the memory read request TLP). The Status field may indicate a status of the comple- tion, e.g., successful/unsuccessful. The BCM field may be used with PCI-X implementations, and otherwise may be zero.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub- block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serial- ized symbols from an external device and transforms the received signals into a bit-stream. The bit-stream is de- serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
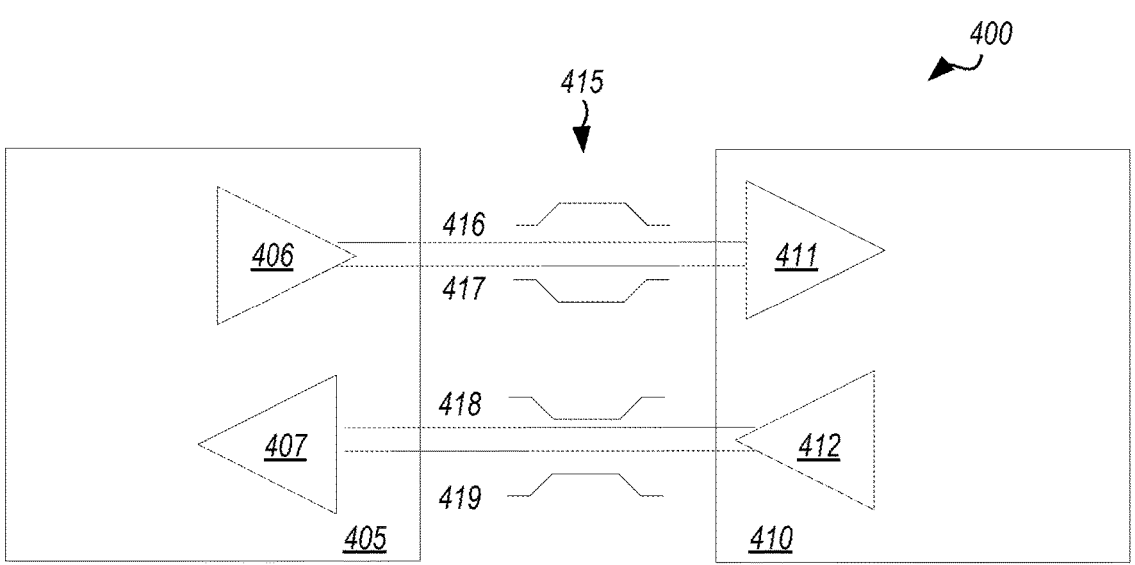
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

A variety of interconnect architectures and protocols may utilize the concepts discussed herein. With advancements in computing systems and performance requirements, improvements to interconnect fabric and link implementations continue to be developed, including interconnects based on or utilizing elements of PCIe or other legacy interconnect platforms. In one example, Compute Express Link (CXL) has been developed, providing an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 5:
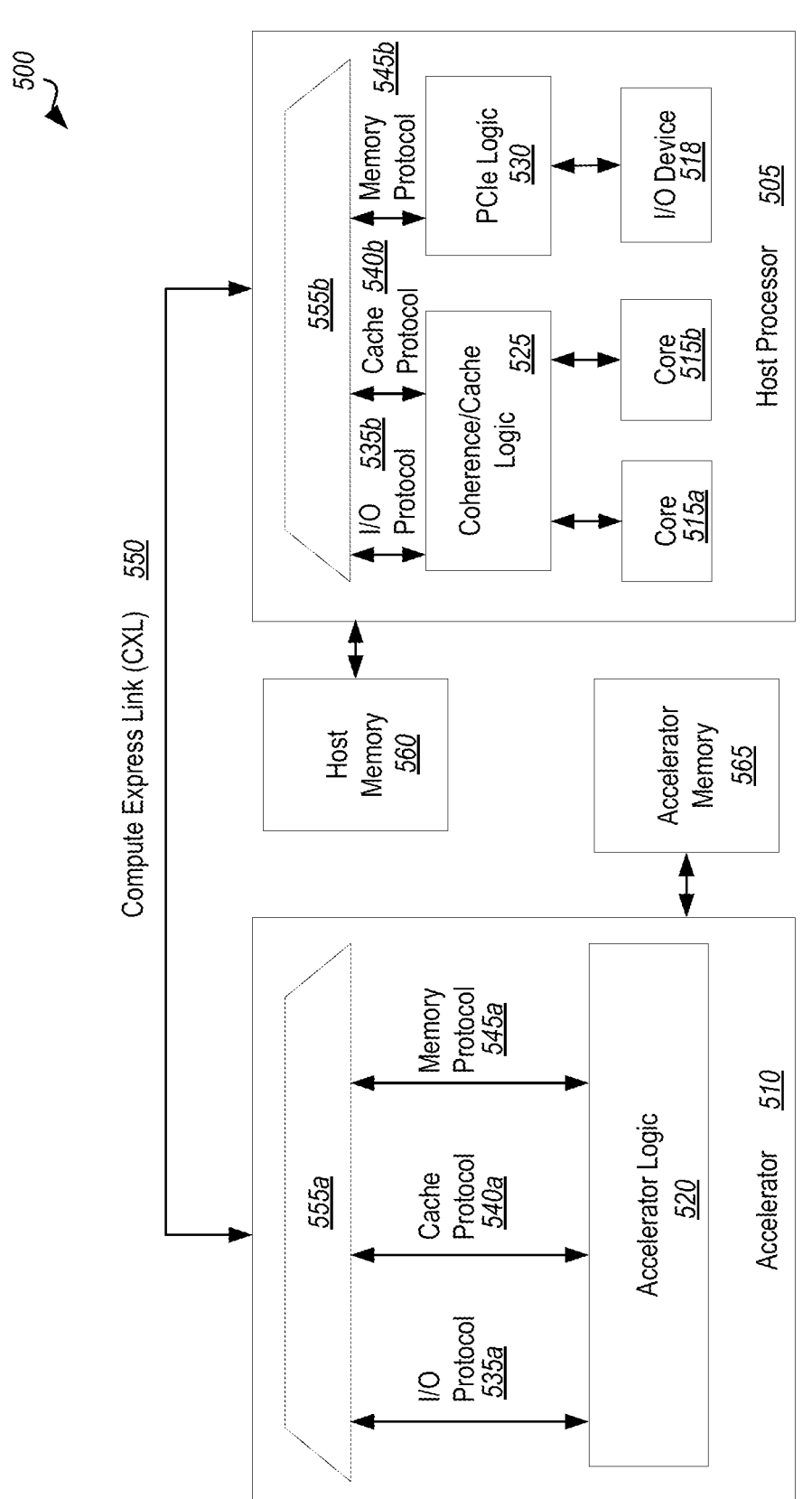
FIG. 5 illustrates an example implementation of a computing system including a host processor and an accelerator coupled by a link.

Turning to FIG. 5, a simplified block diagram 500 is shown illustrating an example system utilizing a CXL link 550. For instance, the link 550 may interconnect a host processor 505 (e.g., CPU) to an accelerator device 510. In this example, the host processor 505 includes one or more processor cores (e.g., 515a-b) and one or more I/O devices (e.g., 518). Host memory (e.g., 560) may be provided with the host processor (e.g., on the same package or die). The accelerator device 510 may include accelerator logic 520 and, in some implementations, may include its own memory (e.g., accelerator memory 565). In this example, the host processor 505 may include circuitry to implement coherence/cache logic 525 and interconnect logic (e.g., PCIe logic 530). CXL multiplexing logic (e.g., 555a-b) may also be provided to enable multiplexing of CXL protocols (e.g., I/O protocol 535a-b (e.g., CXL.io), caching protocol 540a-b (e.g., CXL.cache), and memory access protocol 545a-b (CXL.mem)), thereby enabling data of any one of the supported protocols (e.g., 535a-b, 540a-b, 545a-b) to be sent, in a multiplexed manner, over the link 550 between host processor 505 and accelerator device 510.

In some implementations, a Flex Bus™ port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 6:
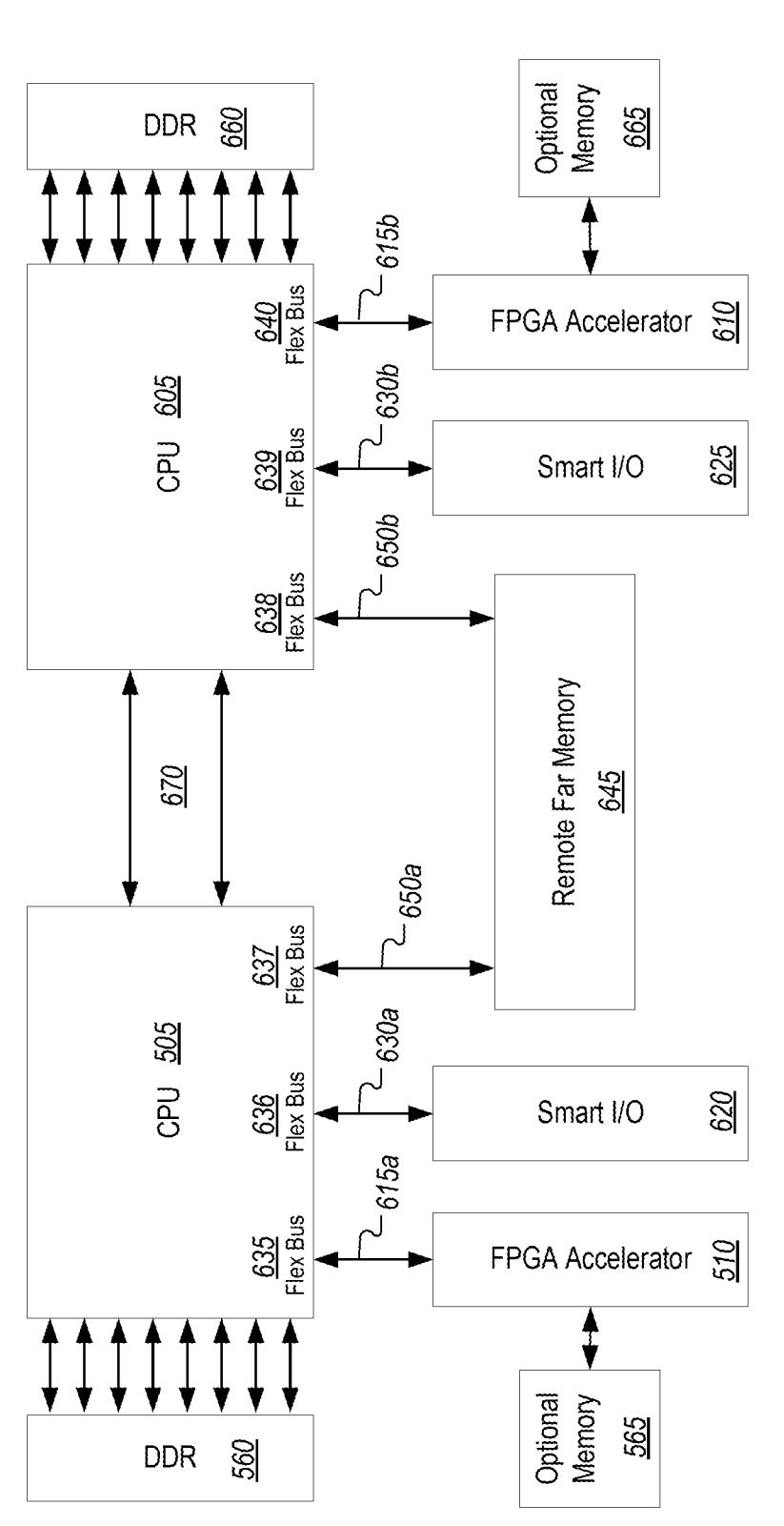
FIG. 6 illustrates an example implementation of a computing system including two or more interconnected processor devices.

Turning to FIG. 6, an example is shown (in simplified block diagram 600) of a system utilizing Flex Bus ports (e.g., 635-640) to implement CXL (e.g., 615a-b, 650a-b) and PCIe links (e.g., 630a-b) to couple a variety of devices (e.g., 510, 610, 620, 625, 645, etc.) to a host processor (e.g., CPU 505, 605). In this example, a system may include two CPU host processor devices (e.g., 505, 605) interconnected by an inter-processor link 670 (e.g., utilizing a UltraPath Interconnect (UPI), Infinity Fabric™, or other interconnect protocol). Each host processor device 505, 605 may be coupled to local system memory blocks 560, 660 (e.g., double data rate (DDR) memory devices), coupled to the respective host processor 505, 605 via a memory interface (e.g., memory bus or other interconnect).

As discussed above, CXL links (e.g., 615a, 650b) may be utilized to interconnect a variety of accelerator devices (e.g., 510, 610). Accordingly, corresponding ports (e.g., Flex Bus ports 635, 640) may be configured (e.g., CXL mode selected) to enable CXL links to be established and interconnect corresponding host processor devices (e.g., 505, 605) to accelerator devices (e.g., 510, 610). As shown in this example, Flex Bus ports (e.g., 636, 639), or other similarly configurable ports, may be configured to implement general purpose I/O links (e.g., PCIe links) 630a-b instead of CXL links, to interconnect the host processor (e.g., 505, 605) to I/O devices (e.g., smart I/O devices 620, 625, etc.). In some implementations, memory of the host processor 505 may be expanded, for instance, through the memory (e.g., 565, 665) of connected accelerator devices (e.g., 510, 610), or memory extender devices (e.g., 645, connected to the host processor (s) 505, 605 via corresponding CXL links (e.g., 650a-b) implemented on Flex Bus ports (637, 638), among other example implementations and architectures.

Figure 7:
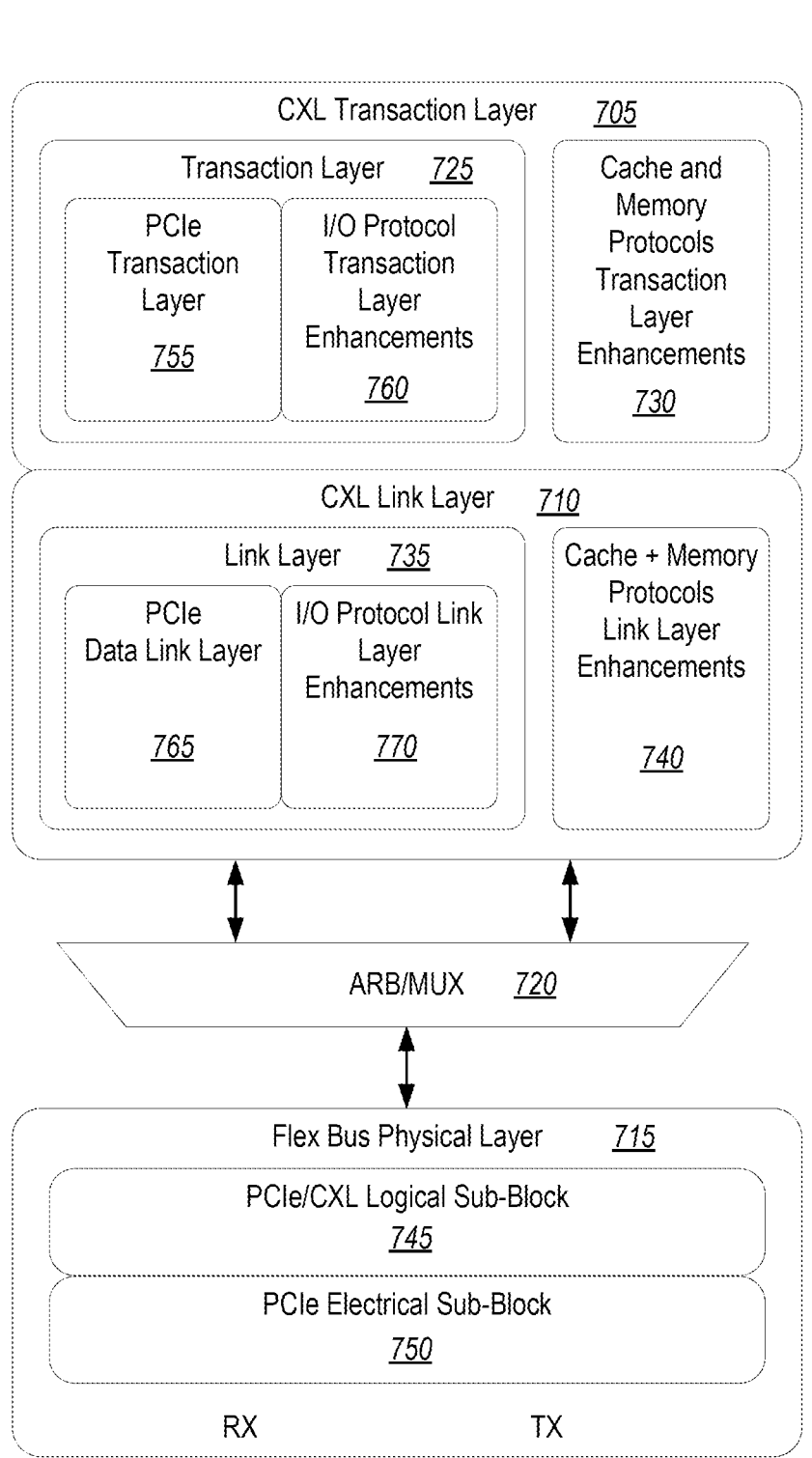
FIG. 7 illustrates a representation of an example port of a device including a layered stack.

FIG. 7 is a simplified block diagram illustrating an example port architecture 700 (e.g., Flex Bus) utilized to implement CXL links. For instance, Flex Bus architecture may be organized as multiple layers to implement the multiple protocols supported by the port. For instance, the port may include transaction layer logic (e.g., 705), link layer logic (e.g., 710), and physical layer logic (e.g., 715) (e.g., implemented all or in-part in circuitry). For instance, a transaction (or protocol) layer (e.g., 705) may be subdivided into transaction layer logic 725 that implements a PCIe transaction layer 755 and CXL transaction layer enhancements 760 (for CXL.io) of a base PCIe transaction layer 755, and logic 730 to implement cache (e.g., CXL-.cache) and memory (e.g., CXL.mem) protocols for a CXL link. Similarly, link layer logic 735 may be provided to implement a base PCIe data link layer 765 and a CXL link layer (for CXl.io) representing an enhanced version of the PCIe data link layer 765. A CXL link layer 710 may also include cache and memory link layer enhancement logic 740 (e.g., for CXL.cache and CXL.mem).

Continuing with the example of FIG. 7, a CXL link layer logic 710 may interface with CXL arbitration/multiplexing (ARB/MUX) logic 720, which interleaves the traffic from the two logic streams (e.g., PCIe/CXL.io and CXL.cache/ CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 715 based on a PCIe physical layer (e.g., PCIe electrical PHY 750). For instance, a Flex Bus physical layer may be implemented as a converged logical physical layer 745 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., x16, x8, x4, x2, x1, etc.). In PCIe mode, links implemented by the port 700 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

Transactional Memory in CXL

Given that CXL offers cache coherence, add-on devices, such as accelerators, network cards, etc. can perform operations on data that is in the main memory of a host (e.g., a server), with the assumption that the add-on device is in the same cache coherent domain. As cloud native software becomes more prevalent, we have the scenario of applications or microservices communicating with each other and often performing updates through the network. For instance, cache-coherence of CXL-attached network devices may allow for a device such as a network card to update data that resides in the main memory of a compute server. However, synchronization is needed to ensure the consistency of the data on the application level. One of the challenges that comes with such synchronization is performance hits/overhead. One way of handling multiple entities needing to access a critical section is via locking. However, as we move to a new computing paradigm enabled by cloud native computing and by CXL-based cache coherency of add-on devices, there will be many entities accessing and operating on host/server data.

For instance, with cloud native computing, there may be many distinct software entities, e.g., via containers and/or microservice based deployments, that span multiple instances/servers and access data in a given node via CXL-attached network cards (or by other means). There may be a sharp emphasis on performance, and real-time performance in particular, for many of these entities. These entities often operate on shared data; for example, there may be services that read different records in a database, including for analytics, reporting, statistical processing, etc. Many of these services might be mostly reading from shared data records, but some may perform updates or combinations of reads and updates to the shared data.

Thus, there may be a scenario where there are multiple (e.g., tens) microservices accessing a shared record of a host, where 95% of them are reading from the shared record. If one of the entities were to lock the record for every microservice, there would be extremely slow forward progress from an application perspective. This creates significant overhead, which reduces performance of the overall system. At the same time, there is also the need to ensure there are no inconsistencies with regard to data access, e.g., avoiding having a record read amidst a partial update/partial performance of a transaction. Furthermore, synchronization between a smart network card and the processor may complicate the application tremendously as two independent programs, which are often written with different tools and programming languages, need to synchronize. This can be error-prone and can easily lead to logical data inconsistencies.

Technologies such as Intel® TSX can be used on host processors as a solution for implementing transactional memory and associated locking. These technologies allow for hardware to implement transactional memory and associated locking without specific software code being written to implement the locking (i.e., the code may be written without thought to implementation of the locking) and have proven to have immense benefits for cloud-based implementations, including for leading cloud databases like SAP® HANA. Further, these technologies offer the capability for multiple entities accessing a software-defined critical section of memory to each proceed in parallel—only if there is a true conflict, such as concurrent updates to the same data etc., is there a notification by a tracker offering options like rollback or alternate resolution mechanisms. In most cases, operations can then proceed in parallel without impeding forward progress.

Unfortunately, there is no current means for transactional memory operations to be performed between a CXL-device (e.g., a network card) and a host processor (e.g., a server CPU). In particular, there are no current means for tracking accesses to critical sections of memory and handling appropriate handshaking with the host platform processors/CPUs. Without this, performance issues may dominate CXL-based operations at scale with multiple microservices accessing shared, cache-coherent memory regions within a server platform.

Accordingly, embodiments herein propose a means for transactional memory operations to be performed between a CXL Type 1 or Type 2 device (e.g., network card) and a host processor/CPU. With embodiments described herein, when an operation is performed between the CXL device and the host CPU using CXL.cache protocol, there may be performance speedups due to the means to speculatively execute an operation without a lock in cases where there is mostly expected to be no data conflict, and rollback when there is a true data conflict. To implement the rollback, certain embodiments may include tags for tracking accesses to critical sections of host memory, across CXL, and for handling appropriate handshaking with CPUs in the host platform.

In particular, embodiments herein may expand the CXL architecture to allow devices connected to a host platform to implement TSX-type transaction flows. To do that, the following elements may be implemented. First, a CXL device (e.g., a network card, accelerator, or graphics processing unit (GPU)) may expose the software stack running on the host device interfaces to start and close a TSX transaction. In the case of a network card, the transaction can comprehend one or multiple memory lines that are associated to one or multiple network packets (which may be defined by the first packet arriving to the network card).

Second, tags may be added to the memory of the CXL-attached device, to track the reads and writes that happen during the transaction. For each transaction of the CXL device, all operations of a transaction may be tracked using a unique tag, and all tagged cache lines may be kept inside the CXL device until the transaction is completed. This way, the cache coherency protocol (e.g., MESIF) can be leveraged to guarantee consistency. For instance, if the processor modifies a cache line that has been read by the CXL device inside the transaction, a coherence traffic signal (e.g., request for ownership (RFO)) may be sent to the CXL device, and if the processor wants to read a cache line that is owned by the CXL device for writing, another coherence traffic signal (e.g., a snoop) may be received. In both cases, the transaction may be aborted and can be retried. By using different tags, multiple transactions can be processed in parallel by the CXL device.

Figure 8:
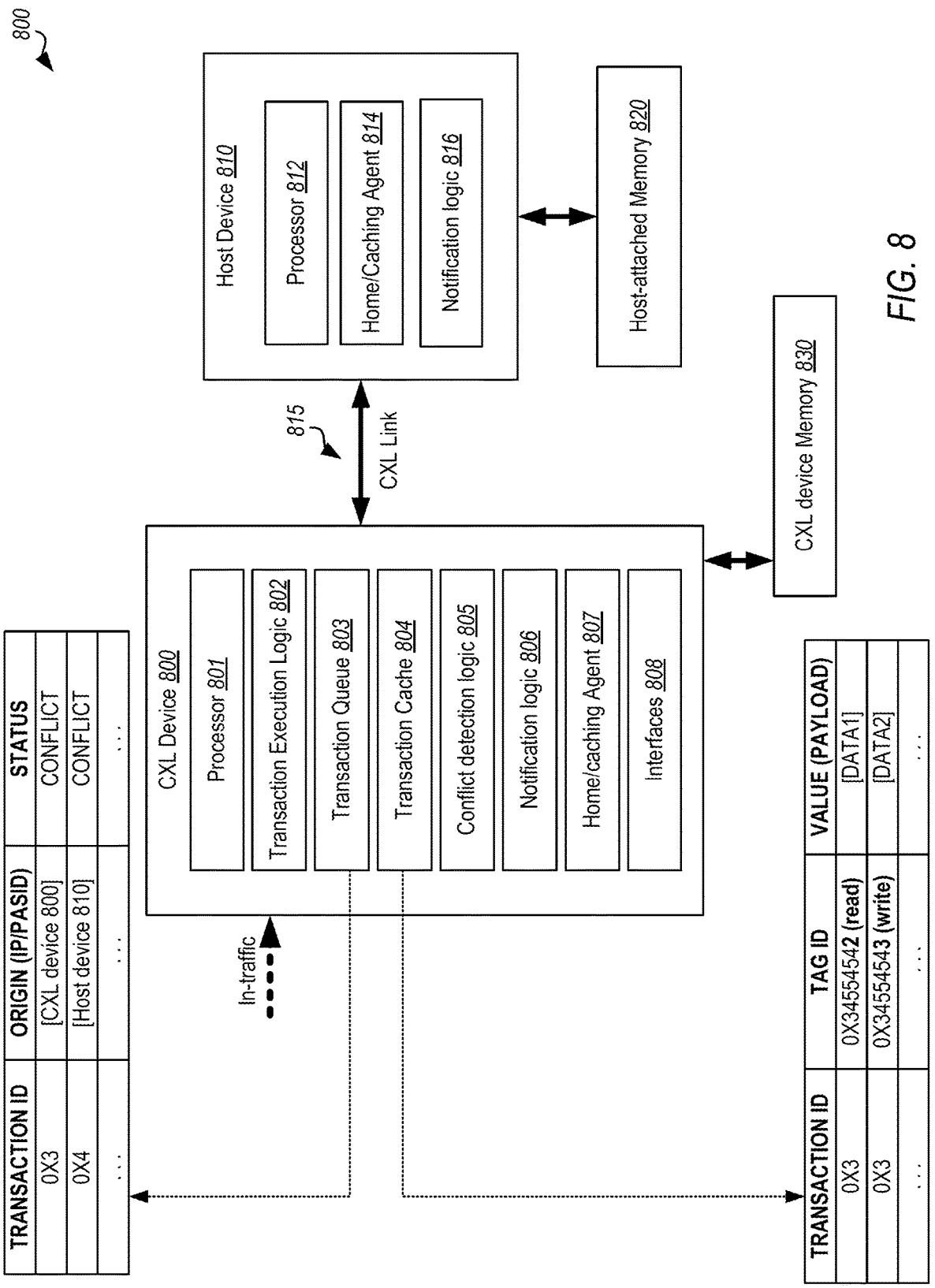
FIG. 8 illustrates an example system that includes a CXL device implementing transactional memory operations with memory attached to a host device over a CXL link.

FIG. 8 illustrates an example system 800 that includes a CXL device 800 implementing transactional memory operations with memory 820 attached to a host device 810 over a link 815. The link 815 implements a protocol (e.g., CXL in the example shown) that allows the CXL device 800 to access the host-attached memory 820 within the same cache coherency domain as the host device 810. The link 815 may accordingly implement an underlying cache coherency protocol (e.g., MESIF). The link 815 may be a direct link or may be a network link that implements a tunneling protocol (e.g., CXL tunneling) to bring a network-attached device into the cache coherency domain.

Moreover, the host device 810 may be able to access CXL device memory 830 over the link 815 in a similar manner. The memory 820 and memory 830 may be addressable memory, e.g., main memory of the respective device or another type of addressable memory. In some cases, the memory 820 may be attached to the host device 810 directly over a bus (e.g., DRAM on a main board/motherboard), while in other cases, the memory 820 may be attached to the host device 810 over a link similar to the link 815 (e.g., a CXL link). Similarly, the memory 830 may be coupled to the CXL device 800 directly over a bus (e.g., via a riser card) or may be coupled to the CXL device 800 over a link (e.g., a CXL link or a link that implements CXL tunneling).

The CXL device 800 includes a processor 801 that may implement transactions with the host-attached memory 820 over the link 815 or with the CXL device memory 830. For example, the CXL device 800 may be an accelerator coupled to the host device 810. As another example, the CXL device 800 may be a smart network interface card (NIC) that can execute transactions on behalf of network nodes that are connected to it (e.g., transaction requests sent to the device 800 by the "in-traffic" as shown in FIG. 8).

The CXL device 800 also includes a transaction execution logic 802 that includes hardware circuitry and/or firmware to execute the memory transactions in the host-attached memory 820 (or the memory 830), a transaction queue 803 to queue the memory transactions to be implemented by the device 800 (e.g., those received from devices/applications via the in-traffic and/or initiated by the processor 801 of the CXL device 800), and a transaction cache 804 to cache transactions that are in progress. The transaction queue 803 may include a number of transactions that each have a unique transaction identifier (ID), an origin of the transaction (e.g., an IP address of the originating device, PASID of the process requesting the transaction, or other similar identifier), and a status of the transaction (e.g., whether there is a conflict or not).

The transaction cache 804 includes records of transactional operations in progress, and may cache data from the memory 820 and/or memory 830 via an underlying cache coherency protocol. The records in the transaction cache 804 may include the unique transaction ID corresponding to a transaction, a tag that uniquely identifies each operation of a transaction, and a data value/payload to be read/written by the transaction (e.g., a cache line to be read/written to). The data value/payload may be useful in the event that the operations are to be rolled back. The tags in the transaction cache 804 may be used to track the reads and writes that occur during each transaction and may be used if a transaction is to be partially or fully rolled back (e.g., in the event of a conflict).

The CXL device 800 further includes conflict detection logic 805, which may be implemented by hardware circuitry and/or firmware, to detect whether a conflict exists between different memory transactions. The conflict detection logic 805 may detect the conflict via the underlying cache coherency protocol being implemented. For instance, the conflict detection logic 805 may detect conflicts via CXL coherence traffic clows from the host processor 812. A conflict may refer to a scenario of a write operation being performed at an address that is part of a transaction that wants to read or write at the same address. For example, the host device 810 could be trying to read or write to the same address that belongs to a write operation within a transaction executing on the CXL device 800.

The conflict detection logic 805, upon detection of the conflict, may interrupt a currently executing transaction (e.g., by sending an interrupt to the transaction execution logic 802, or to similar logic within the host device 810). The conflict detection logic 805 may communicate with the home/caching agent 814 of the host device 810 to detect whether conflicts exist for accessing the memory 820, and may communicate with the home/caching agent 807 of the CXL device 800 to detect whether conflicts exists for accessing the memory 830.

In some embodiments, the conflict detection logic 805 may include logic that can determine which transaction is to proceed upon detection of a conflict (e.g., through priorities of transaction origin, timing, or other criteria). In some cases, a transaction that is currently executing may be rolled back so that another process may implement its transaction first. In some cases, a newly requested transaction may be retried at a later time, when a conflict is no longer detected/occurring. Further, upon detection of a conflict, the conflict detection logic 805 may cause a notification to be delivered to the transaction's origin via the notification logic 806. In some cases, the notification may only be sent to an origin of a transaction that is to be rolled back or retried, i.e., if a transaction is to continue, then its origin might not be notified. One or both of the conflicting transactions may be marked as conflicting in the transaction queue 803, e.g., as shown.

For instance, in the example shown, there are at least two memory transactions to be implemented, identified by 0x3 and 0x4, respectively, in the transaction queue 803. As shown, the transaction cache 804 includes records of both a read and write of the transaction labeled as 0x3, each having a unique tag to identify the operation of the transaction. In one example, the transaction 0x3 may be in progress when a coherence traffic signal 0x4 from the host device 810 indicates a write on the same region of memory in use by the transaction 0x3 (e.g., within the memory 820 or memory 830). The conflict detection logic 805 can compare the write destination of the signal 0x4 with transactions in the queue 803 and see that the 0x3 is currently operating on that memory region. Both may be flagged as conflicting in the queue 803 as shown, and the transaction 0x3 may be rolled back. Thus, the operations shown in the cache 804 for transaction 0x3 may be rolled back and not committed to memory.

The CXL device 800 also includes a home/caching agent 807 that may initiate transactions into the memory 830 and may retain copies of cache lines within the memory 830 in its own cache structure. It may also service the transactions and may be responsible for managing conflicts that might arise and may provide appropriate data and ownership responses as required by a given transaction's flow. The home/caching agent 807 may communicate with the home/caching agent 814 of the host device 810 to implement cache coherency between the two devices.

The CXL device 800 further includes a set of interfaces 808 that are exposed to the software stack running on the device 800. The interfaces 808 implement the start and stop of the transaction with the host-attached memory 820. In certain embodiments, the interfaces 808 may include a first interface to start a transaction by a local application running on the CXL device 800. The first interface can specify a transaction identifier (ID) associated with the transaction (if the ID is already in use, then an error can be reported) and a memory range that is included as part of the transaction (which can allow for optimizations to be implemented at the device level). The interfaces 808 may also include a second interface to stop a transaction by a local application running on the device 800. The second interface can specify a transaction ID associated with the transaction. The interfaces 808 may further include a third interface, e.g., for network cards trying to implement transactions by the indicated "in-traffic", that allows external entities to start or stop a transaction. In such cases, the transactions can be defined in one of the following ways. In a first embodiment, the external entities may use the first and second interfaces described above directly using specific network packets. In another embodiment, a transaction may be associated only to the payload that is included within the network packet. For instance, with 1.5 MB network packets, network card device may execute the write of the 1.5 MB consecutively. In yet another embodiment, the transaction may be associated to a set of network packets that are mapped with a group ID. In this case, a first network packet in a group will include the group ID and the number of packets that will be associated with the transaction.

The host device 810 includes a processor 812 that can implement transactional memory operations using locks, a home/caching agent 814, and notification logic 816. In some embodiments, the processor 812 may be embodied as a core or multiple cores of a processing unit of the host device 810. In some embodiments, the processor 812 of the host device 810 may initiate memory transactions in the memory 820 or the memory 830 (which is within the same cache coherency domain). The host device 810 may include similar logic to the transaction execution logic 802 and conflict detection logic 805 for executing the memory transactions. The host device 810 also includes a home/caching agent 814 that functions similar to the host/caching agent 807 of the device 800. The host device 810 further includes notification logic 816 that may be implemented similar to the notification logic 806, e.g., may provide notifications to CXL-attached devices (e.g., 800) in the event of conflicts for transactions to occur within the memory 820 and/or if any transactions are to be retried or rolled back.

In operation, since transactions to be performed on the host-attached memory 820 may include multiple operations that are to be completed in an all-or-nothing fashion (i.e., atomic transactions), the transaction cache 808 may store cache lines from the host-attached memory 820 and the cache lines stored in the transaction cache 808 may be modified according to a transaction in the transaction queue 803. Only once the transaction has completed will the transaction execution logic 802 attempt to write the modified cache lines to the host-attached memory 820 (or otherwise send the modified cache lines to the processor 812 or other processors).

For each transaction, all reads and writes can be tracked using the tags, and all tagged cache lines may be kept within the cache 808 until the transaction has completed. In this way, the underlying cache coherency protocol (e.g., MESIF) used for transactional memory operations can be leveraged to guarantee consistency. If the processor 812 of the device 810 modifies a cache line that has been read by the CXL device 800 inside a transaction, a request for ownership (RFO) is sent to the device 800. If the processor 812 wants to read a cache line that is currently owned (via an RFO sent by the device 800) for writing, a snoop will be received. In both cases, the transaction may be aborted and can be retried. By using different tags, multiple transactions can be processed in parallel by the network card or device.

Where a CXL protocol is implemented over the link 815, it may be responsible for generating the RFOs from the processor 812 and consistency protocols that are mapped into CXL.cache that will trigger the RFOs described above. Current CXL protocols may be expanded to the device 800 such that the CXL protocol can be used to notify the device 800 when a conflict is identified for a transaction of the processor 812. For example, a new CXL.TSX extension may be introduced in the CXL protocols to handle such conflict notifications. In certain embodiments, upon a conflict being identified at the device 800, the device 800 can generate a CXL.TSX notification message that is sent to the host device 810. The notification message may include a transaction ID associated with the conflict, the conflicting address in memory, and/or an indication of whether there is to be a rollback (or not) of the transaction. The host device 810 may then generate a software interrupt to the software stack that has generated the conflict.

Figure 9:
FIG. 9 illustrates a flow diagram of an example process of implementing transactional memory operations in a CXL device in accordance with embodiments of the present disclosure.

FIG. 9 illustrates a flow diagram of an example process 900 of implementing transactional memory operations in a CXL device (e.g., 800) in accordance with embodiments of the present disclosure. Operations in the example processes may be performed by hardware, firmware, software, or a combination thereof embodied on a device (e.g., CXL device 800 and its constituent components) connected to a host processor (e.g., 812) and memory (e.g., 820) over a CXL-based link (e.g., 805). In some embodiments, a computer-readable medium may be encoded with instructions (e.g., a computer program) that implement one or more of the operations in the example processes. The example processes may include additional or different operations, and the operations may be performed in the order shown or in another order. In some cases, one or more of the operations shown in FIG. 9 are implemented as processes that include multiple operations, sub-processes, or other types of routines. In some cases, operations can be combined, performed in another order, performed in parallel, iterated, or otherwise repeated or performed another manner.

At 902, a new transaction is received by the CXL device. The transaction may originate from the CXL device or from a device connected to the CXL device. In one example, the transaction may originate from a processor (or other logic of the CXL device) of the CXL device. In another example, the CXL device may be a smart network card or similar type of and the transaction may be received by the smart network card from one of many different nodes/applications connected to the card over a network (e.g., in a cloud environment). The transaction may include multiple operations that are to be performed as an atomic transaction, i.e., in an all-or-nothing fashion.

The CXL device then begins processing the transaction, and at 904, the CXL device determines (e.g., via conflict detection logic such as logic 805 of FIG. 8) whether a conflict exists with respect to an operation of the transaction. For example, the logic may determine whether there is an existing transaction that is accessing the same memory location as the incoming transaction. If no conflict is detected at 904, then the CXL device continues processing the transaction at 906 (e.g., performs a next operation of the transaction) and determines at 908 whether the transaction is finished. If the transaction has then finished, the CXL device notifies the host that the transaction has finished at 910 and continues with other operations at 920 (e.g., processing different transactions, etc.). Otherwise, the CXL device re-determines whether there is a conflict at 904. If not, the CXL device continues to process the transaction as previously described.

If a conflict is detected at 904, then the CXL device determines at 912 whether to retry the transaction or not. This determination may be based on whether the transaction has already been retried or not, or whether a threshold number of retries have already occurred. If the CXL device wants to retry the transaction after detecting a conflict, then the transaction is rolled back and restarted at 914 and the CXL device re-determines whether there is a conflict at 904 and continues to process the transaction as described above. If the CXL device determines to not retry the transaction, then it rolls back the transaction at 916, notifies the host of the detected conflict at 918, and then continues other operations at 920. The notification sent at 918 may be formatted as described above, e.g., as a new type of CXL.TSX message format that includes a transaction ID associated with the conflict, a conflicting address in memory, and/or an indication of whether there is to be a rollback (or not) of the transaction.

The foregoing disclosure has presented a number of example techniques for implementing hardware transactional memory support for CXL devices. It should be appreciated that such techniques may be applied to other interconnect protocols as well. For instance, while some of the techniques discussed herein were described with reference to PCIe- or CXL-based protocols, it should be appreciated that techniques may apply to other interconnect protocols, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others, or to other types of packet-based protocols.

Note that the apparatus, methods, and systems described above may be implemented in any electronic device or system as aforementioned. As specific illustrations, the figures below provide exemplary systems for utilizing embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 10:
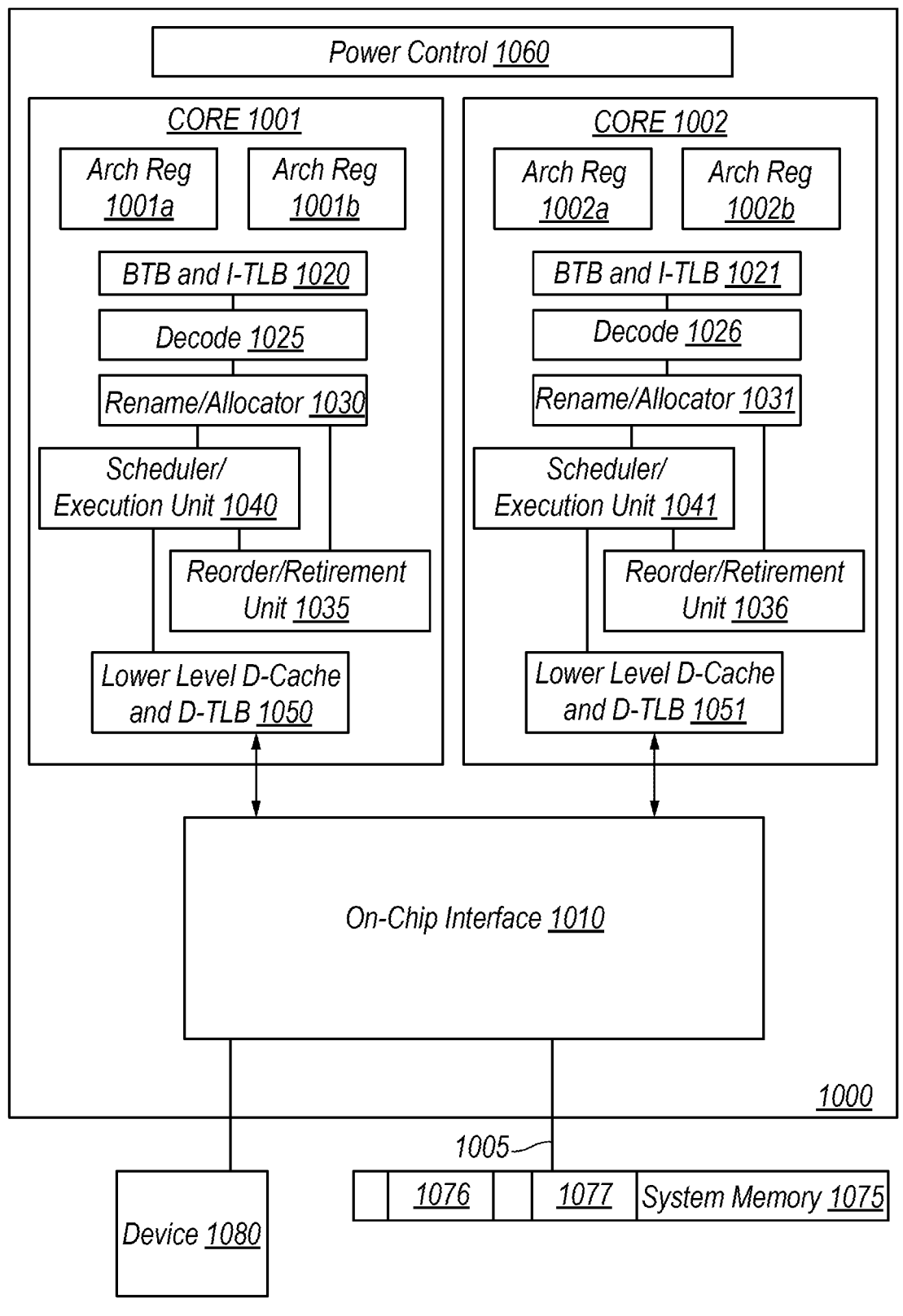
FIG. 10 illustrates an embodiment of a block diagram for a computing system including a multicore processor.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
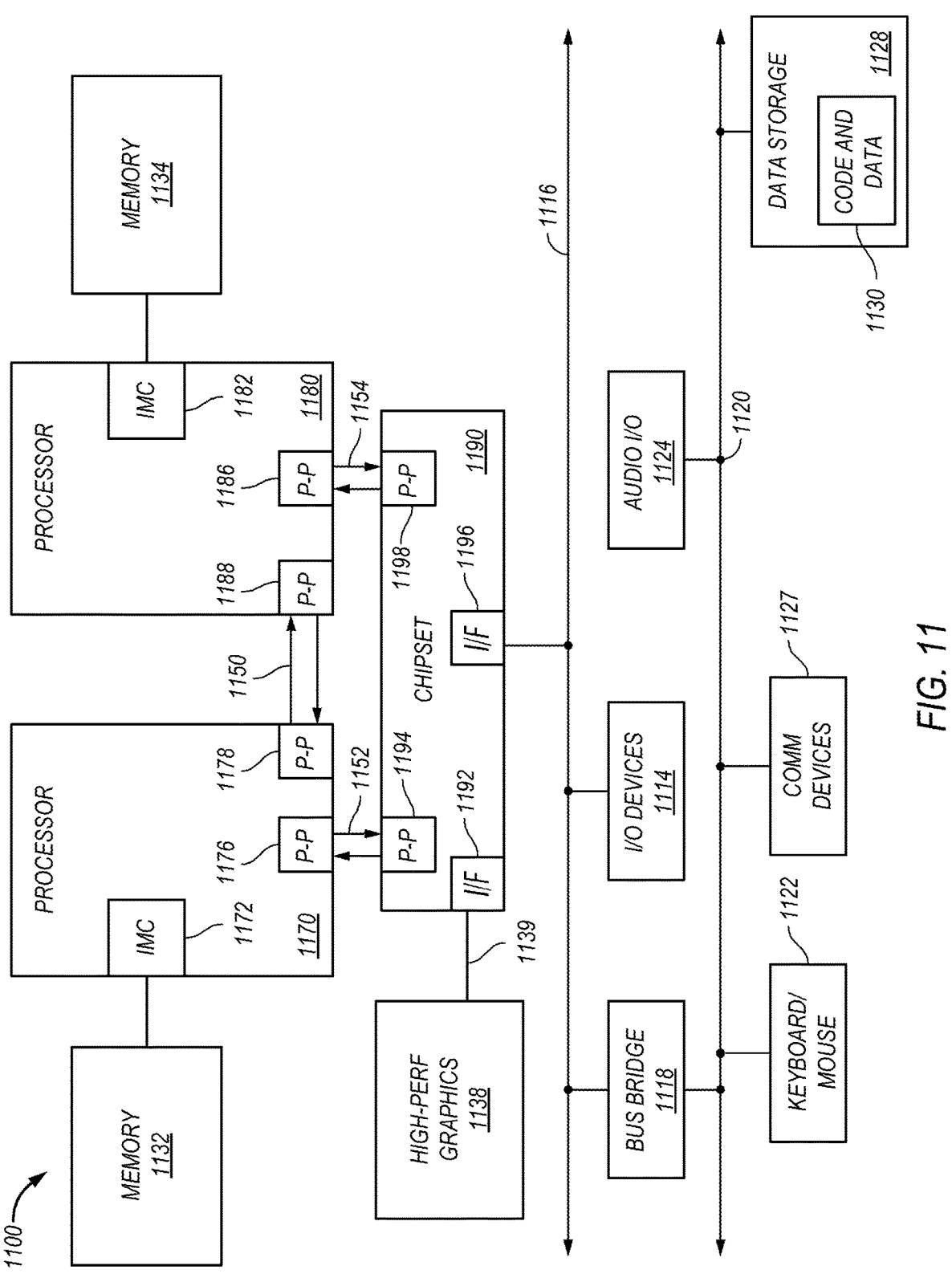
FIG. 11 illustrates an embodiment of a block for a computing system including multiple processors.

Referring now to FIG. 11, shown is a block diagram of another system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as a high-performance architecture. As a result, aspects of the present disclosure may be implemented within the QPI architecture.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

While aspects of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module may also refer to the non-transitory medium including the code, which is specifically adapted to be executed by the microcontroller to perform predetermined operations. In some embodiments, use of the term logic includes hardware, such as transistors, registers, or other hardware, such as programmable logic devices.

Use of the phrase 'configured to,' may refer to arranging, putting together, manufacturing, offering to sell, importing and/or designing an apparatus, hardware, logic, or element to perform a designated or determined task. For example, an apparatus or element thereof that is not operating is still 'configured to' perform a designated task if it is designed, coupled, and/or interconnected to perform said designated task. Furthermore, use of the phrases 'to,' 'capable of/to,' and or 'operable to,' may refer to some apparatus, logic, hardware, and/or element designed in such a way to enable use of the apparatus, logic, hardware, and/or element in a specified manner. Use of configured to, to, capable to, or operable to, may thus refer to the latent state of an apparatus, logic, hardware, and/or element, where the apparatus, logic, hardware, and/or element is not operating but is designed in such a manner to enable use of an apparatus in a specified manner.

The following examples pertain to embodiments in accordance with this Specification. Although each example described below is described with respect to Compute Express Link (CXL)-based protocols, any of the following examples may be utilized for a PCIe-based protocol, a Universal Serial Bus (USB)-based protocol, a Cache Coherent Interconnect for Accelerators (CCIX) protocol, or a Transmission Control Protocol/Internet Protocol (TCP/IP).

Example 1 is an apparatus comprising: a port to couple to a host processor over a Compute Express Link (CXL)-based link; a transaction queue to queue memory transactions to be completed in an addressable memory coupled to the apparatus; a transaction cache; conflict detection circuitry to determine whether a conflict exists between memory transactions based on coherence traffic on the CXL-based link; and transaction execution circuitry to: access a transaction from the transaction queue, the transaction to implement one or more memory operations in the memory; store data from the memory to be accessed by the transaction operations in the transaction cache; execute operations of the transaction, including modifying data stored in the transaction cache; and based on completion of the transaction, cause the modified data from the transaction cache to be stored in the memory.

Example 2 includes the subject matter of Example 1, wherein the transaction is an atomic transaction.

Example 3 includes the subject matter of Example 1 or 2, wherein the transaction execution circuitry is to cause a coherence traffic signal to be transmitted to the host processor over the link based on accessing the transaction.

Example 4 includes the subject matter of any one of Examples 1-3, wherein the transaction cache is to store records of each respective operation of a transaction.

Example 5 includes the subject matter of Example 4, wherein each operation record comprises a unique identifier of the transaction and a unique identifier of the operation within the transaction.

Example 6 includes the subject matter of Example 4, wherein each record comprises store data associated with the operation of the transaction.

Example 7 includes the subject matter of any one of Examples 1-6, wherein the conflict detection logic is to interrupt the transaction execution circuitry based on detection of a conflict.

Example 8 includes the subject matter of Example 7, wherein the transaction execution circuitry is to roll back one or more operations of the transaction based on detection of a conflict.

Example 9 includes the subject matter of Example 7 or 8, wherein the transaction execution circuitry is to retry one or more operations of the transaction based on detection of a conflict.

Example 10 includes the subject matter of any one of Examples 1-9, wherein the conflict detection logic is to detect a conflict based on a coherence traffic signal indicating a write operation to a location in the memory being accessed by the accessed transaction.

Example 11 includes the subject matter of any one of Examples 1-10, wherein the conflict detection logic is to flag a transaction in the transaction queue based on detection of a conflict.

Example 12 includes the subject matter of any one of Examples 1-11, further comprising notification logic to notify the transaction execution logic of a detected conflict.

Example 13 includes the subject matter of any one of Examples 1-12, wherein the addressable memory is directly coupled to the apparatus over a bus.

Example 14 includes the subject matter of any one of Examples 1-12, wherein the addressable memory is coupled to the apparatus over the CXL-based link.

Example 14.5 is a system comprising: a host device coupled to an apparatus over a CXL-based link, the apparatus according to any one of Examples 1-14.

Example 15 is a system comprising: a host processor; a peripheral device coupled to the host processor via a Compute Express Link (CXL)-based link; and memory in the cache coherency domain with the host processor and the peripheral device; and wherein the peripheral device comprises: a transaction queue to queue memory transactions to be completed in the memory; a transaction cache to store data associated with the memory transactions; and transaction execution circuitry to execute operations of the memory transactions, including modifying data stored in the transaction cache associated with the memory transactions; and based on completion of the transactions, cause the modified data from the transaction cache to be stored in the memory.

Example 16 includes the subject matter of Example 15, wherein the peripheral device further comprises conflict detection circuitry to determine whether a conflict exists between memory transactions based on coherence traffic on the CXL-based link.

Example 17 includes the subject matter of Example 16, wherein the conflict detection logic is to interrupt the transaction execution circuitry based on detection of a conflict.

Example 18 includes the subject matter of Example 16 or 17, wherein the transaction execution circuitry is to roll back or retry one or more operations of the transaction based on detection of a conflict by the conflict detection circuitry.

Example 19 includes the subject matter of any one of Examples 15-18, wherein the transaction execution circuitry is to cause coherence traffic signals to be transmitted to the host processor over the CXL-based link based.

Example 20 includes the subject matter of any one of Examples 15-19, wherein the transaction cache is to store records of each respective operation of a transaction, the records comprising a unique identifier of the transaction, a unique identifier of the operation within the transaction, and data from the memory associated with each operation within the transaction.

Example 21 is a method comprising: accessing, by transaction execution circuitry of a device coupled to a host device over a Compute Express Link (CXL)-based link, an atomic transaction from a transaction queue of the device, the atomic transaction to be executed in memory coupled to the host device; storing, in a transaction cache of the device, data from a memory location indicated by the atomic transaction; execute operations of the transaction, including modifying the data stored in the transaction cache; and based on completion of the transaction, storing the modified data from the transaction cache in the memory.

Example 22 includes the subject matter of Example 21, further comprising detecting, based on coherence traffic on the CXL-based link, whether a conflict exists between the atomic transactions and one or more other transactions to be executed in the memory location.

Example 23 includes the subject matter of Example 22, wherein the conflict detection is based on a coherence traffic signal indicating a write operation of another transaction to the memory location indicated by the atomic transaction.

Example 24 includes the subject matter of Example 22 or 23, further comprising: detecting that a conflict exists; and retrying one or more operations of the transaction based on the detected conflict.

Example 25 includes the subject matter of Example 24, further comprising rolling back the transaction and notifying the host device of the transaction roll back.

Example 26 includes an apparatus comprising means to perform one or more elements of a method described in or related to any of Examples 21-25 above, or any other method or process described herein.

Example 27 includes an apparatus comprising logic, modules, or circuitry to perform one or more elements of a method described in or related to any of Examples 21-25 above, or any other method or process described herein.

Example 28 includes a system comprising: one or more processors and one or more computer-readable media comprising instructions that, when executed by the one or more processors, cause the one or more processors to perform the method, techniques, or process as described in or related to any of Examples 21-25 above, or portions thereof Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing, a detailed description has been given with reference to specific exemplary embodiments. It will, however, be evident that various modifications and changes may be made thereto without departing from the broader spirit and scope as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a port to couple to a host processor over a Compute Express Link (CXL)-based link;
a transaction queue to queue memory transactions to be completed in an addressable memory coupled to the apparatus;
a transaction cache;
conflict detection circuitry to determine whether a conflict exists between memory transactions based on coherence traffic on the CXL-based link; and
transaction execution circuitry to:
access a transaction from the transaction queue, the transaction to implement one or more memory operations in the memory;
store records of each respective operation of the transaction and data from the memory to be accessed by the operations in the transaction cache;
execute operations of the transaction, including modifying data stored in the transaction cache; and
based on completion of the transaction, cause the modified data from the transaction cache to be stored in the memory.

2. The apparatus of claim 1, wherein the transaction is an atomic transaction.

3. The apparatus of claim 1, wherein the transaction execution circuitry is to cause a coherence traffic signal to be transmitted to the host processor over the link based on accessing the transaction.

4. The apparatus of claim 1, wherein each operation record comprises a unique identifier of the transaction and a unique identifier of the operation within the transaction.

5. The apparatus of claim 1, wherein each record comprises store data associated with the operation of the transaction.

6. The apparatus of claim 1, wherein the conflict detection circuitry is to interrupt the transaction execution circuitry based on detection of a conflict.

7. The apparatus of claim 6, wherein the transaction execution circuitry is to roll back one or more operations of the transaction based on detection of a conflict.

8. The apparatus of claim 6, wherein the transaction execution circuitry is to retry one or more operations of the transaction based on detection of a conflict.

9. The apparatus of claim 1, wherein the conflict detection circuitry is to detect a conflict based on a coherence traffic signal indicating a write operation to a location in the memory being accessed by the accessed transaction.

10. The apparatus of claim 1, wherein the conflict detection circuitry is to flag a transaction in the transaction queue based on detection of a conflict.

11. The apparatus of claim 1, further comprising notification circuitry to notify the transaction execution circuitry of a detected conflict.

12. The apparatus of claim 1, wherein the addressable memory is directly coupled to the apparatus over a bus.

13. The apparatus of claim 1, wherein the addressable memory is coupled to the apparatus over the CXL-based link.

14. A system comprising:
a host processor;
a peripheral device coupled to the host processor via a Compute Express Link (CXL)-based link; and
memory in a cache coherency domain with the host processor and the peripheral device; and
wherein the peripheral device comprises:
a transaction queue to queue memory transactions to be completed in the memory;
a transaction cache to store records of in-progress operations of the memory transactions; and
transaction execution circuitry to
execute operations of the memory transactions, including modifying data stored in the transaction cache associated with the memory transactions; and
based on completion of the transactions, cause the modified data from the transaction cache to be stored in the memory.

15. The system of claim 14, wherein the peripheral device further comprises conflict detection circuitry to determine whether a conflict exists between memory transactions based on coherence traffic on the CXL-based link.

16. The system of claim 15, wherein the conflict detection circuitry is to interrupt the transaction execution circuitry based on detection of a conflict.

17. The system of claim 15, wherein the transaction execution circuitry is to roll back or retry one or more operations of the transaction based on detection of a conflict by the conflict detection circuitry.

18. The system of claim 14, wherein the transaction execution circuitry is to cause coherence traffic signals to be transmitted to the host processor over the CXL-based link based.

19. The system of claim 14, wherein the transaction cache is to store records comprising a unique identifier of the transaction, a unique identifier of the operation within the transaction, and data from the memory associated with each operation within the transaction.

20. A method comprising:

accessing, by transaction execution circuitry of a device coupled to a host device over a Compute Express Link (CXL)-based link, an atomic transaction from a transaction queue of the device, the atomic transaction to be executed in memory coupled to the host device;

store, in a transaction cache of the device, records of each respective operation of the atomic transaction and data from a memory location indicated by the atomic transaction;

execute operations of the transaction, including modifying the data stored in the transaction cache; and based on completion of the transaction, store the modified data from the transaction cache in the memory.

21. The method of claim 20, further comprising detecting, based on coherence traffic on the CXL-based link, whether a conflict exists between the atomic transactions and one or more other transactions to be executed in the memory location.

22. The method of claim 21, wherein the conflict detection is based on a coherence traffic signal indicating a write operation of another transaction to the memory location indicated by the atomic transaction.

23. The method of claim 21, further comprising:

detecting that a conflict exists; and retrying one or more operations of the transaction based on the detected conflict.

24. The method of claim 23, further comprising rolling back the transaction and notifying the host device of the transaction roll back.

* * * * *